United States Patent [19]

Monroe et al.

[11] 3,853,507

[45] Dec. 10, 1974

[54] COLD TRAP UNIT

[75] Inventors: Paul S. Monroe, Elyria, Ohio;
Michael C. Chervenak, III, Portage, Pa.

[73] Assignee: The United States of America as represented by the United States Atomic Energy Commission, Washington, D.C.

[22] Filed: Dec. 31, 1947

[21] Appl. No.: 795,036

[52] U.S. Cl. .................................... 55/269, 55/387
[51] Int. Cl. .......................................... B01d 53/00
[58] Field of Search ....... 62/91.5 A, 91.5 D, 1, 121, 62/175; 183/2, 5, 115

[56] References Cited
UNITED STATES PATENTS
1,864,397  6/1932  Zumbro ........................... 62/121 X Primary Examiner—Samuel W. Engle
Attorney, Agent, or Firm—John A. Horan; David S. Zachry

[57] ABSTRACT

1. A gas recovery system of the character described comprising a casing, a length of tubing disposed within the casing for the passage of gases, means for feeding gases to the length of tubing, means in said casing for cooling the tubing for solidifying said gases on the walls thereof, means for applying heat to the tubing for converting the solids to liquid form, and means for removing the liquid from the tubing and storing it.

8 Claims, 2 Drawing Figures

INVENTORS
Paul S. Monroe &
Michael C. Chervenak
BY Robert A. ...

COLD TRAP UNIT

Our invention relates to cold traps, and more particularly to cold traps for the solidification and removal of gases.

In a gaseous diffusion system for the separation of isotopes of elements it may become necessary to isolate a section of the system and to remove and recover the gases in the aforementioned system. This is particularly true in cases of breakdowns of portions of the system. As an example, it is highly desirable to recover the gaseous uranium hexafluoride from cascade sections of a system for the separation of isotopes of uranium, on failure of the system or portions thereof. Recovery is important since such gases are valuable and very expensive, and because they are highly reactive and of a corrosive nature. Escaping gas would react with the available moisture to form a highly active acid, and the toxic effect of the gas would be injurious to human beings and to health.

Heretofore, recovery of the gas has been effected by purging the system with nitrogen or other inert gas and absorbing the gas in carbon traps. This, however, is a very slow reclamation process due to the slow absorption rate of the carbon, and in addition recovery by such process introduces chemical changes so that further chemical processes and steps are necessary to reconvert the gases to their original chemical state. Other forms of cold traps have also been used for this purpose, but they only lend themselves to large bulky installations of fixed character.

Applicants with a knowledge of all these problems in the prior art have for an object of their invention the provision of a cold trap for the recovery of highly reactive and expensive gases by condensing them directly to the solid state.

Applicants have as another object of their invention the provision of a cold trap for the recovery of highly reactive gases by converting them directly to the solid state and providing volumetric capacity with a minimum loss through the trap.

Applicants have as another object of their invention the provision of a portable unit for recovery of highly reactive, toxic gases by converting them into solids.

Applicants have as a further object of their invention the provision of a system for removing and reclaiming highly reactive gases by alternately converting the gases into solids and then into liquids to facilitate their removal and storage.

Applicants have as a still further object of their invention the provision of a portable unit which is simple and easy to construct and operate, and which obviates the necessity for connecting pipe lines, valves, and other components inherent in known cold traps, which render them suitable only for fixed installations.

Applicants have as a still further object of their invention the provision of a mobile cold trap for the recovery of gases, which is especially adapted for use by maintenance crews in large installations since it lends itself to movement from place to place where breakdowns and failures occur, thereby eliminating the multiplicity of piping and controls which would be necessary in servicing many different units of equipment located at distances from each other in a fixed installation.

Other objects and advantages of our invention will appear from the following specification and accompanying drawings, and the novel features thereof will be particularly pointed out in the annexed claims.

Figure 1:
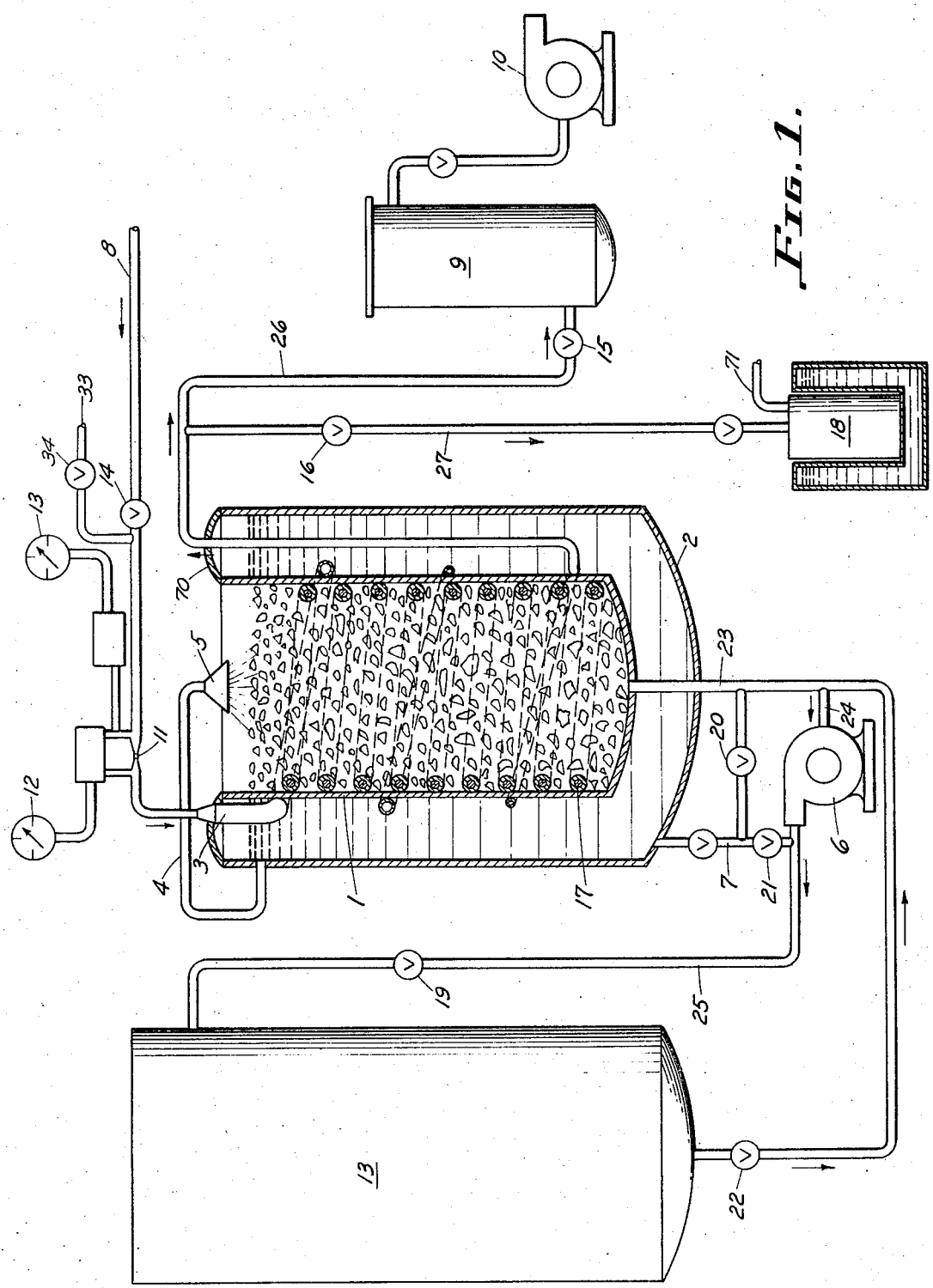
FIG. 1 is a schematic of one form of our improved cold trap for recovering highly reactive gases.

Referring to the drawings in detail, 1 designates a container for the reception of refrigerant, such as dry ice or the like. Disposed about the container 1, in spaced relation thereto, is a jacket 2 for the reception of liquid heat transfer medium, such as trichlorethylene in the annular space between container 1 and jacket 2 and in the bottom of the jacket. The condensing portion of the unit comprises a length of copper tubing 3 which is coiled in helical fashion about the outer wall of the container 1. In this connection, it may be noted that the upper portions of the coil of tubing are of larger diameter than the lower portions. This arrangement is to provide volumetric capacity in the fore part of the trap and adequate transfer area in the "clean-up" section thereof. As an example, the coil may be made up of eight feet of 4 inch copper tubing, eight feet of 2 inch copper tubing, and 45 feet of 1 inch copper tubing.

Line 4 serves to provide communication from the annular space between the container 1 and jacket 2, and the container 1, and extends from the upper extremity of jacket 2 over the container 1. It terminates above the container 1 in a nozzle 5 so that the liquid refrigerant may be circulated to the jacket 2 and sprayed over the dry ice in the container 1 by the nozzle or spray head 5. In order to provide pressure and a path for the circulation of the liquid refrigerant, a line 23 extends from the lower extremity of container 1 through jacket 2 on to the lower end of storage drum or tank 13. Line 23 is also connected into branch line 24 which feeds into the intake of circulating pump 6. The outlet side of pump 6 feeds into line 25 which extends into the upper extremity of drum 13 and into branch line 7 connected to the lower extremity of jacket 2.

Line 8 is connected to the section of the diffusion equipment from which the uranium hexafluoride is to be recovered. The equipment is evacuated through line 8, condenser coil 3 and carbon trap 9 by means of vacuum pump 10. Line 8 is provided with an orifice 11 and the necessary instruments connected thereto for measuring the flow rate to the trap. The carbon trap 9 is employed to recover any traces of uranium hexafluoride which are not condensed in the cold trap.

Line 27 branches off from the main line 26 connecting coil 3 with carbon trap 9, and leads to a reservoir 18 which is vented at 71, and which serves to store the uranium hexafluoride, or other material, in the liquid or the gaseous state after removal from the walls of the coil of tubing 3. Line 33 serves to furnish nitrogen through a critical orifice 34 to dilute the feed mixture.

In the operation of this modification of our invention, container 1 may be filled with dry ice. Pump 6 circulates a liquid refrigerant through the system from container 1, through line 23, branch line 24, pump 6, branch line 7, jacket 2, line 4 and nozzle 5 back to the container 1. It will be understood, of course, that the upper extremities of container 1 and jacket 2 are joined through a section 70 of torus configuration to provide a closed space and permit the application of pumping pressure to the liquid transfer medium or refrigerant in such space and accomplish the circulation, and in turn the cooling action.

With valves 14 and 15 open, the vacuum pump 10 draws the gas to be recovered along with other gases through line 8, the coil of tubing 3 and the trap 9. In the case of uranium hexafluoride, it solidifies at 56.4°C under 760 mm. pressure. Accordingly, the gas solidifies on the inner surface of the coil of tubing 3. When said coil is plugged to a predetermined degree which is indicated by the differential pressure indicator 12, valves 14 and 15 are closed and valve 16 is opened. The liquid refrigerant or transfer medium is then pumped from the trap into storage drum 13 by opening valves 19 and 20, and closing valve 21. If container 1 had dry ice therein, and if any of it remains, it must be removed. The unit is then heated by the "calrod" heater element 17 which is wrapped spirally about the inner surface of the container 1 and is connected to an appropriate power source. When the temperature rises to the "melting point" of the uranium hexafluoride which is about 64.5°C at 1,165 mm. of pressure, it flows as a liquid under its own vapor pressure through lines 26 and 27 to storage tank 18. After this flashing operation is completed, the unit is again filled with fluid refrigerant by opening valves 21 and 22 and closing valves 19 and 20 permitting the refrigerant to flow from tank 13 through line 23 to the unit. The circulating pump 6 may be used to pump the liquid from line 23 through line 7 to the jacket. When the unit is full, valve 22 is closed. Valve 16 is closed and valves 14 and 15 are opened and the apparatus is then in condition to repeat the cycle just described. These operations are continued until the gases are substantially recovered from the diffusion equipment.

As an alternative to the use of a calrod heating coil to raise the temperature of the unit, superheated steam may be fed into the space between the container 1 and the jacket 2 after the refrigerant has been withdrawn.

Figure 2:
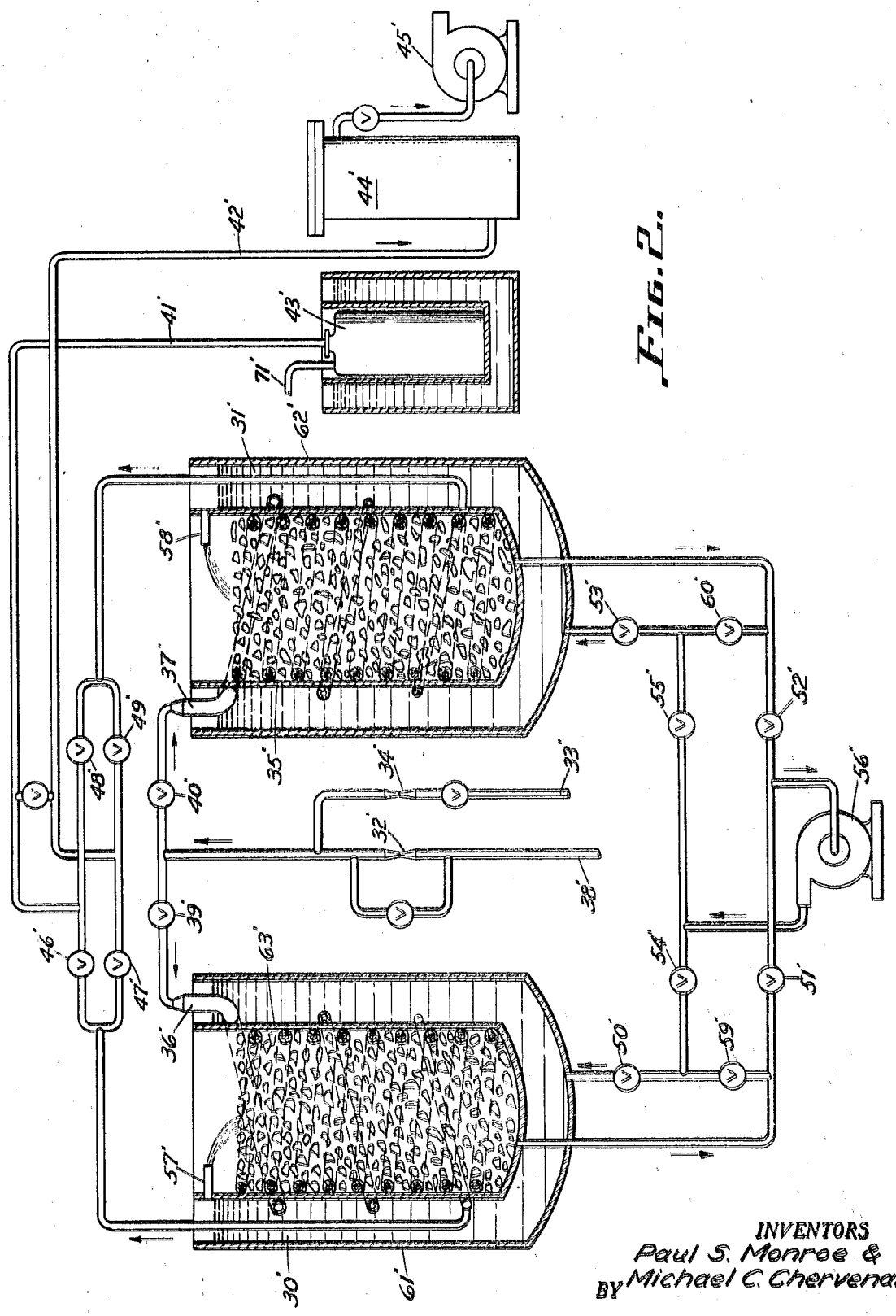
FIG. 2 is a schematic of another form of our improved cold trap employing dual condensing units.

A second modification of the above-described cold trap unit is shown in FIG. 2. This mobile unit differs from the first in that (a) two cold traps 30' and 31' are used for alternate operation, (b) no refrigerant storage tank is required, the refrigerant being kept in whichever cold trap is not being heated and (c) a critical orifice 32' is installed in the feed line to the cold trap to automatically limit the flow. A nitrogen line 33' is installed through which nitrogen can be added through a second critical orifice 34' to dilute the feed mixture. The nitrogen is added to increase the trap capacity which was found to be greatest when handling a mixture of about 25 to 50 percent $UF_6$.

In this modification it will be understood that 61', 62' represent the outer jackets spaced from and inclosing the containers 63', 35'. Copper coils 36', 37' are fed from line 38' through valves 39', 40' and in turn feed lines 41', 42' which lead to storage tank 43', vented at 71' and carbon trap 44' and vacuum pump 45', respectively. Their flow to these units is controlled by valves 46', 47', 48', and 49'. Valves 50', 51', 52', 53', 54', and 55' serve to control the circulation of refrigerant to the cold trap units under the action of circulating pump 56'.

In the operation of this modification refrigerant may be circulated through unit 30' by opening valves 51', 54', and 50' and closing valves 52' and 55'. The refrigerant passes from pump 56' up through the space between container 63' and jacket 61', through nozzle 57' to container 63', then out of the lower end of container 63' to pump 56'. Gas is fed through line 38', open valve 39', coil of tubing 36', open valve 47', line 42' to trap 44' and vacuum pump 45'. Valves 40', 46', 48', and 49' are closed. When a sufficient deposit has been built up on the inner walls of the coil of tubing 36', valve 54' is closed and valves 53', 55', and 59' are opened. The circulating pump then removes the refrigerant from unit 30' and pumps it into unit 31'. Steam is then fed into unit 30' from an appropriate source (not shown) and passes between the container 63' and jacket 61'. During the period of heating and before the flash temperature is reached, valves 39', 47' are closed and valve 46' is opened so that the vapor pressure will cause the liquid to flow through line 41' to storage tank 43+. While this operation is taking place, valves 51' and 59' may be closed and valve 52' opened, permitting refrigerant to be circulated from pump 56' to the space between container 35' and jacket 62' through nozzle 58' container 35' back to the pump 56'. Likewise, valves 40' and 49' may be opened permitting gas to flow from line 38' through coil of tubing 37', open valve 49+, line 42', to trap 44' and vacuum pump 45'. When this operation is completed, refrigerant may be removed from unit 31' and pumped into unit 30' by opening valves 60' and 54', and closing valves 55' and 59'.

It will thus be seen that while the uranium hexafluoride is being removed from the coil of tubing 36' of unit 30', it is being built up in the coil of tubing 37' of unit 31'. This provides a continuous process wherein units 30' and 31' serve alternately to build up deposits of uranium hexafluoride and to remove and store them.

Having thus described our invention, we claim:

1. A gas recovery system of the character described comprising a casing, a length of tubing disposed within the casing for the passage of gases, means for feeding gases to the length of tubing, means in said casing for cooling the tubing for solidifying said gases on the walls thereof, means for applying heat to the tubing for converting the solids to liquid form, and means for removing the liquid from the tubing and storing it.

2. A gas recovery system of the character described comprising a casing, a gas receiver disposed within the casing, means for feeding gases to the receiver, means for cooling the receiver for solidifying the gases on the walls thereof, a line for removing excess gases from the receiver, a trap in said line for absorbing traces of said gases, means for applying heat to said casing to convert the solids on the receiver walls to liquid, and means for removing the liquid.

3. A gas recovery system of the character described comprising spaced inner and outer containers, tubing interposed between said containers, means for feeding gases to said tubing, means for cooling the tubing to solidify the gases on the walls thereof, means for applying heat to the tubing to convert the solids into liquid, and means for removing the liquid from the tubing.

4. A gas recovery system of the character described comprising spaced inner and outer containers, a length of tubing helically disposed about the inner container in the space between said containers, means for feeding gases to and removing them from said tubing, means for cooling the tubing to solidify the gases on the walls of the tubing, means for applying heat to the tubing to convert the solids to liquid form, and means for removing the liquid.

5. A gas recovery system of the character described comprising spaced inner and outer containers, tubing interposed in helical fashion between said containers, means for feeding gases to said tubing, means for circulating refrigerant through said containers to solidify the gases on the walls of the tubing, means for applying heat to the tubing to convert the solids to liquid form, and means for removing and storing the liquids.

6. A gas recovery system of the character described comprising spaced inner and outer containers, a length of tubing coiled to helical form and interposed between said inner and outer containers, means for feeding gases to said tubing, means for removing liquid from the tubing, and means for alternately circulating refrigerant through the containers for solidifying the gases on the walls of the tubes and for applying heat to said tubing to convert the solids into liquid to facilitate easy removal.

7. A gas recovery system of the character described comprising spaced inner and outer containers, a length of tubing helically disposed about said inner container, said tubing being progressively smaller in size from one end to the other, means for feeding gases to the larger end of said tubing, means for cooling the tubing to solidify the gases on the walls thereof, means for applying heat to the tubing to convert the solids to liquids, and means for removing the liquid from the smaller end of said tubing.

8. A gas recovery system of the character described comprising a pair of casings, a length of tubing in each of said casings, means for feeding gases to the tubing in one casing while removing liquid from the tubing in the other casing, means for alternately circulating refrigerant through each of said casings to solidify the gases on the walls of the tubing positioned therein, and means for alternately applying heat to the tubing in each of said casings to convert the solids to liquid form.

* * * * *